US 7,484,593 B2

(12) United States Patent
Braun et al.

(10) Patent No.: US 7,484,593 B2
(45) Date of Patent: Feb. 3, 2009

(54) ACOUSTIC STRUCTURE AND METHOD OF MANUFACTURING THEREOF

(75) Inventors: Rudolf (Rudy) Braun, Winnipeg (CA); Clarence P. Terpstra, West St. Paul (CA); Loren Hendrickson, Starbuck (CA)

(73) Assignee: The Boeing Company, Chicago, IL (US)

( * ) Notice: Subject to any disclaimer, the term of this patent is extended or adjusted under 35 U.S.C. 154(b) by 344 days.

(21) Appl. No.: 11/001,752

(22) Filed: Dec. 2, 2004

(65) Prior Publication Data
US 2006/0118357 A1 Jun. 8, 2006

(51) Int. Cl.
*E04B 1/82* (2006.01)
(52) U.S. Cl. .................. 181/292; 181/290; 181/210; 181/203; 244/1 N
(58) Field of Classification Search .............. 181/290, 181/292, 210, 203; 244/1 N
See application file for complete search history.

(56) References Cited

U.S. PATENT DOCUMENTS

| 4,826,106 | A | * | 5/1989 | Anderson ............... 244/117 R |
| 5,246,520 | A | * | 9/1993 | Scanlon et al. ............. 156/245 |
| 5,604,010 | A | * | 2/1997 | Hartz et al. .................. 428/118 |
| 6,190,602 | B1 | * | 2/2001 | Blaney et al. ............... 264/443 |
| 2004/0154252 | A1 | * | 8/2004 | Sypeck et al. ............ 52/506.01 |
| 2004/0195718 | A1 | * | 10/2004 | Obrachta et al. ............ 264/156 |

OTHER PUBLICATIONS

Loctite Aerospace, *SynSpand® EA 9890/Expanding Syntactic Film* (visited Dec. 2, 2004) http://www.loctite.com/int_henkel/loctite/binarydata/pdf/SynSpand_EA_9890.pdf.

* cited by examiner

*Primary Examiner*—Walter Benson
*Assistant Examiner*—Forrest M Phillips
(74) *Attorney, Agent, or Firm*—Alston & Bird LLP

(57) ABSTRACT

There is provided an acoustic structure and a method of manufacturing such acoustic structure. The acoustic structure comprises at least one uncured facesheet ply defining a plurality of perforations, an adhesive that includes a corresponding plurality of perforations, and a honeycomb core portion adhered to the facesheet ply by the adhesive. The acoustic structure undergoes a single curing process, advantageously an autoclave curing process, to cure the entire acoustic structure. By adhering at least one uncured facesheet ply to the honeycomb core portion, the curing process is capable of curing both the facesheet ply and the adhesive with a single curing process. The single curing process accordingly obviates additional process steps and a sacrificial adhesive layer typically used in other acoustic structures.

13 Claims, 4 Drawing Sheets

ACOUSTIC STRUCTURE AND METHOD OF MANUFACTURING THEREOF

BACKGROUND OF THE INVENTION

1. Field of the Invention

The present invention is related to acoustic structures, and more particularly, to an improved acoustic structure manufactured by a simplified and relatively low cost method.

2. Description of Related Art

Acoustic panels and other objects that include acoustic structures are typically used for acoustic absorption for various applications. For example, jet engines often include thrust reverser blocker doors that advantageously include an acoustic structure to absorb a portion of the noise created by the jet engine. Other less-demanding applications for acoustic structures include theaters, broadcasting studios, or offices. Acoustic structures typically include a honeycomb core that is adhered to a panel, film, or other portion.

The process for creating an acoustic structure is typically very time-consuming and labor-intensive. The standard acoustic structure for a thrust reverser blocker door is manufactured using the following sequential steps: 1) perforate facesheet plies, which typically comprise multiple plies of hand laid up woven fabric, by pressing the plies through a pin mandrel; 2) apply a sacrificial layer of film adhesive to the facesheet; 3) autoclave cure the perforated facesheet and remove the pin mandrel; 4) apply mechanical abrasion to the sacrificial layer of film adhesive to establish a uniform and bond-ready surface; 5) vacuum bag an unsupported film adhesive to the bond-ready surface of the facesheet; 6) reticulate the unsupported film adhesive with an air knife to clear the adhesive from the perforations in the facesheet; 7) bond a honeycomb core to the facesheet using the reticulated film adhesive; and 8) autoclave cure the entire acoustic structure. Therefore, the present process for creating an acoustic structure involves many processes, and the two separate autoclave curing processes can be particularly time-consuming.

Therefore, a need exists for a less time-consuming, and more cost-effective technique for manufacturing an acoustic structure. Specifically, a need exists for a method of manufacturing that reduces the number of autoclave curing processes that are required to manufacture an acoustic structure.

BRIEF SUMMARY OF THE INVENTION

The invention addresses the above needs and achieves other advantages by providing an acoustic structure and method for manufacturing acoustic structures that require only one autoclave curing process. The present invention reduces the number of processes that are required to manufacture an acoustic structure, thereby reducing the requisite time and expense. Specifically, the present invention eliminates one autoclave curing process by adhering an uncured perforated facesheet (with the pin mandrel left in place) having a plurality of perforations to the honeycomb core portion before autoclave curing the acoustic structure.

One embodiment of the present invention includes an acoustic structure that has an uncured facesheet ply that defines a plurality of perforations. Advantageously, the facesheet ply comprises a plurality of woven fabric plies. The acoustic structure also has an adhesive that is adhered to the uncured facesheet ply, and the adhesive also defines a plurality of perforations. The adhesive advantageously comprises a film adhesive or, more specifically, a supported film adhesive. The acoustic structure also includes a honeycomb core portion, which is advantageously a high density honeycomb core, that is adhered to the adhesive while the facesheet ply and adhesive are uncured.

The present invention also provides a method of manufacturing an acoustic structure. One method includes applying an adhesive to an uncured facesheet ply, which may be advantageously performed by vacuum bag compacting the facesheet ply prior to applying the adhesive. The method further includes perforating the facesheet ply and adhesive, preferably by pressing a pin mandrel through the facesheet ply and adhesive, to define a plurality of perforations in the facesheet ply. A honeycomb core portion is adhered to the adhesive, and the honeycomb core portion, adhesive, and facesheet ply are cured to define the acoustic structure. Advantageously, the curing process defines an autoclave curing process at or above a temperature of 200° F.

An alternative method for manufacturing the acoustic structure includes perforating an uncured facesheet ply, advantageously using a pin mandrel. An adhesive, such as a film adhesive, is then applied to a honeycomb core portion. The honeycomb core portion is adhered to the adhesive, and the honeycomb core portion, adhesive, and facesheet ply are cured to define the acoustic structure. Advantageously, the curing process defines an autoclave curing process at or above a temperature of 200° F.

Therefore, the present invention eliminates the step of curing the facesheet ply and obviates the need for a sacrificial layer of adhesive and subsequent abrasion of that layer prior to adhering an unsupported film adhesive for adhering the honeycomb core portion to the facesheet ply and the need to reticulate that film adhesive. The present invention accordingly provides an acoustic structure with comparable qualities that is manufactured by a quicker and cheaper method.

BRIEF DESCRIPTION OF THE SEVERAL VIEWS OF THE DRAWINGS

Figure 1:
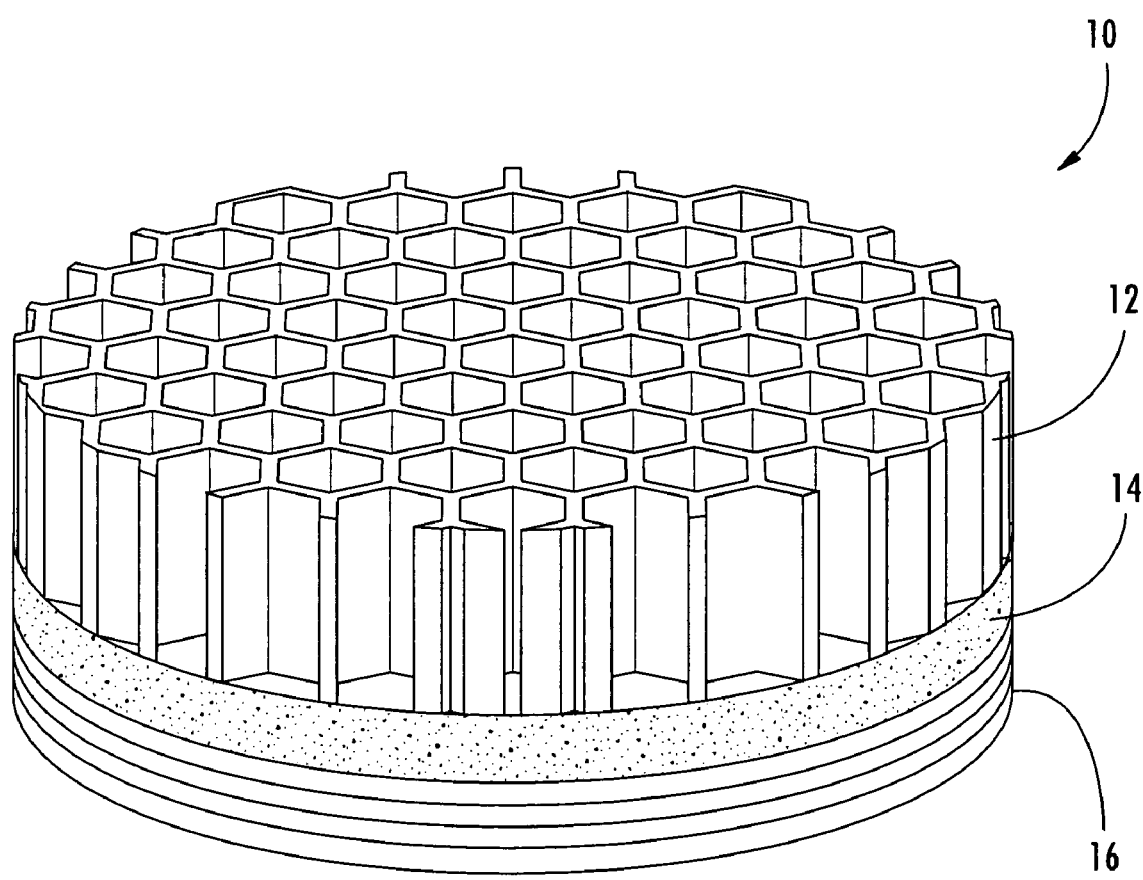
Figure 2:
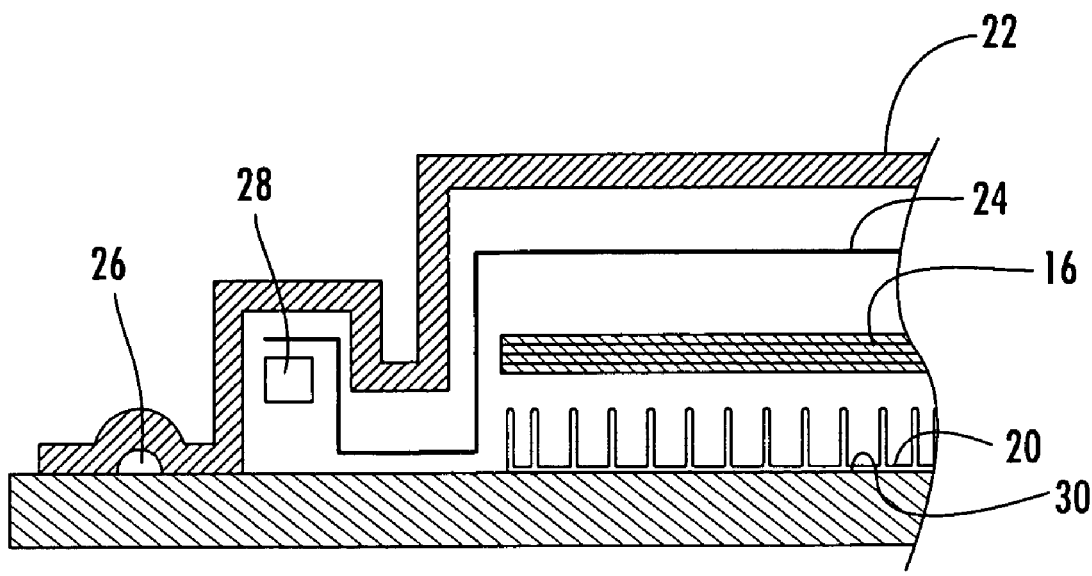
Figure 3:
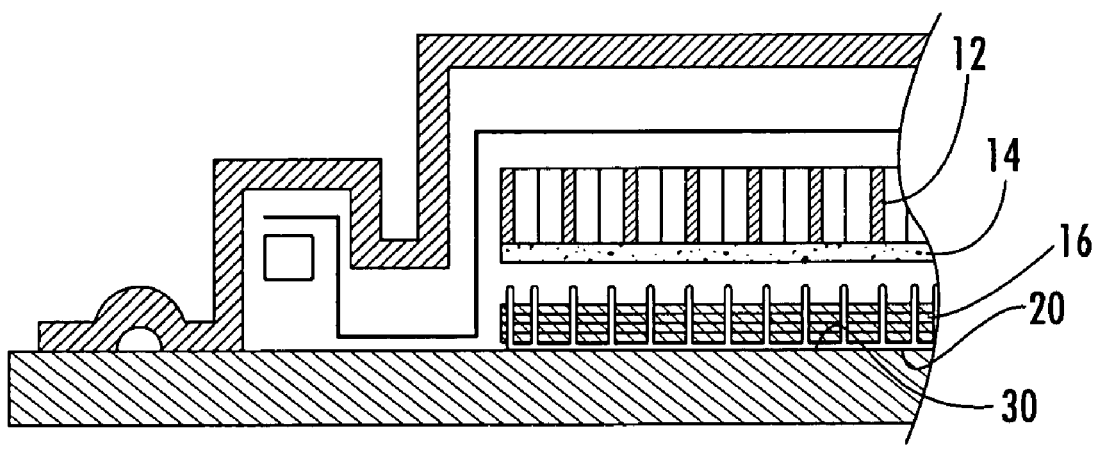
Figure 4:
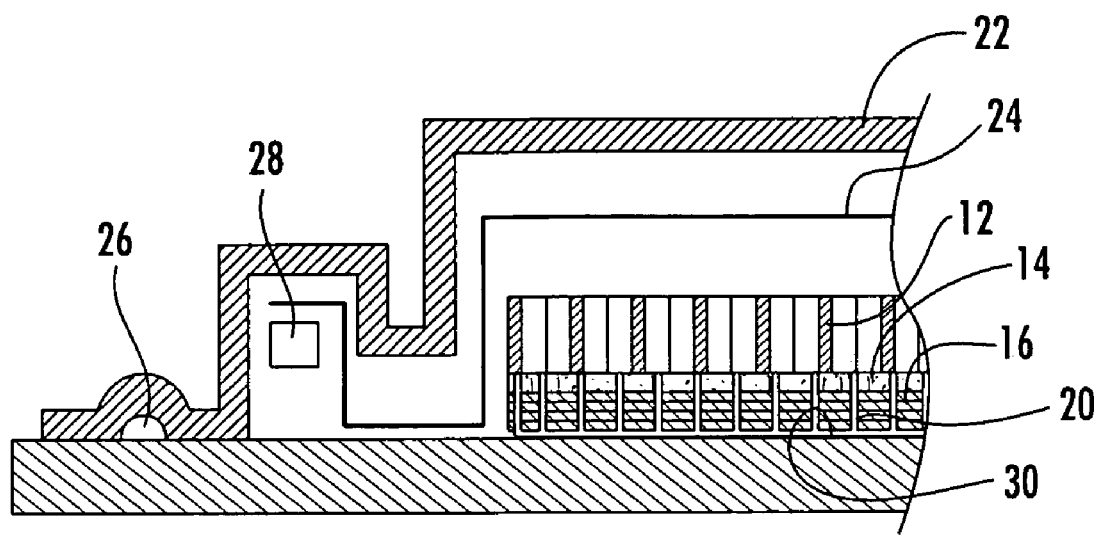
Figure 5:
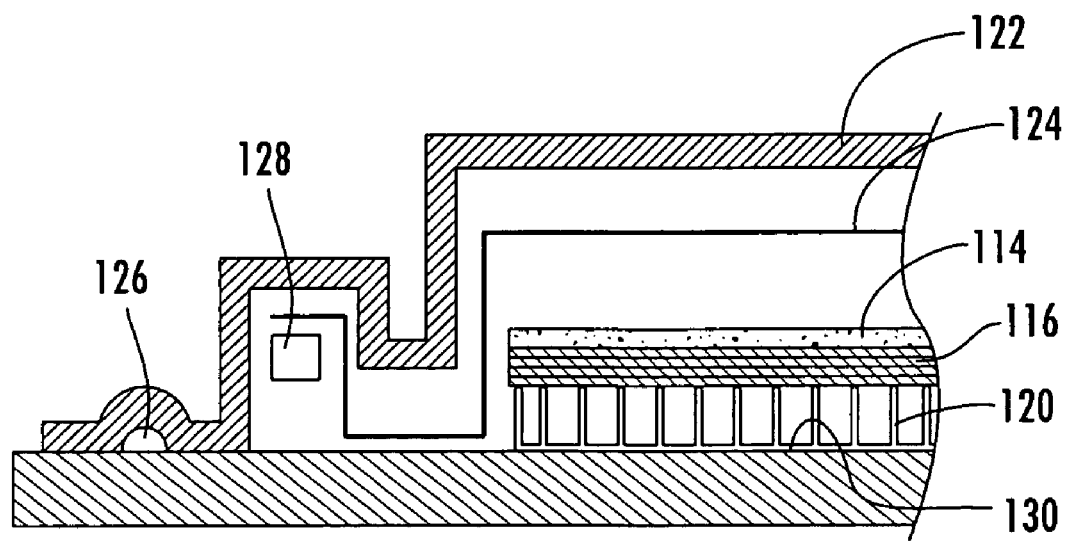
Figure 6:
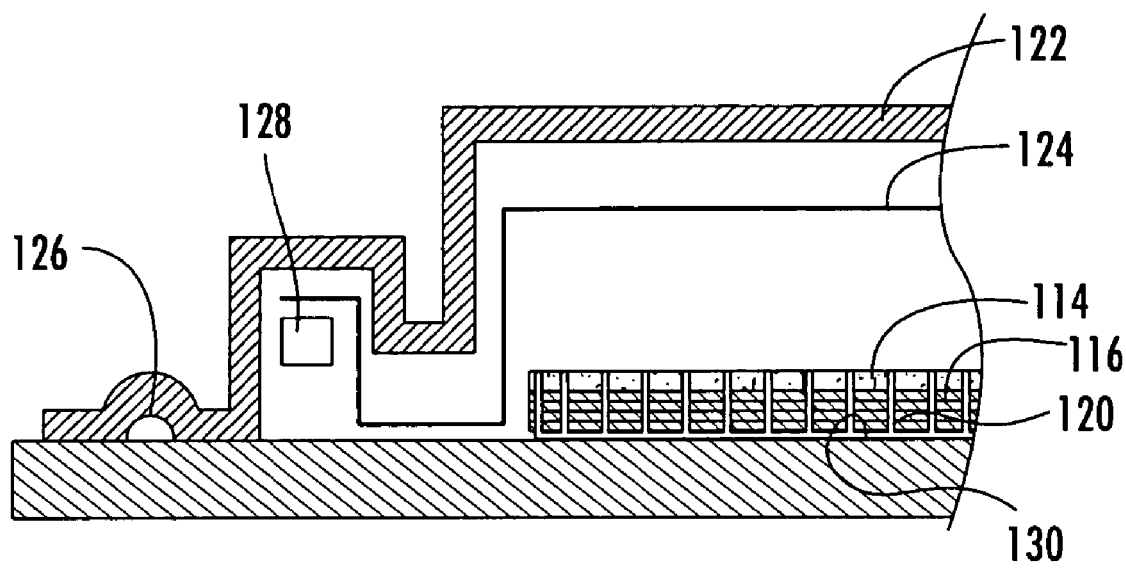

Having thus described the invention in general terms, reference will now be made to the accompanying drawings, which are not necessarily drawn to scale, and wherein:

FIG. 1 is a perspective view of an acoustic structure according to one embodiment of the present invention, showing a honeycomb core portion adhered to an uncured facesheet ply and adhesive;

FIG. 2 is schematic, cross-sectional view of a method of manufacturing an acoustic structure according to a first embodiment of the present invention, illustrating an uncured facesheet ply prior to perforation with a pin mandrel;

FIG. 3 is schematic, cross-sectional view of a method of manufacturing an acoustic structure according to a first embodiment of the present invention, illustrating a honeycomb core portion with a film adhesive prior to adhering to the uncured facesheet ply;

FIG. 4 is schematic, cross-sectional view of a method of manufacturing an acoustic structure according to a first embodiment of the present invention, illustrating a honeycomb core portion adhered to the uncured facesheet ply;

FIG. 5 is schematic, cross-sectional view of a method of manufacturing an acoustic structure according to a second embodiment of the present invention, illustrating an uncured facesheet ply and an adhesive applied thereto prior to perforation with a pin mandrel; and FIG. 6 is a schematic, cross-sectional view of a method of manufacturing an acoustic structure according to a second embodiment of the present invention, illustrating an uncured facesheet ply and an adhesive perforated by a pin mandrel.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIGS. 1-6, an acoustic structure 10 and methods for manufacturing the acoustic structure in accordance with the present invention are illustrated. The acoustic structure 10 of the illustrated embodiments is a cylindrical cross-sectional portion of a jet engine blocker door assembled according to the present invention. Further embodiments of the present invention may comprise acoustic structures of various shapes, materials, and other parameters and acoustic structures for any application. In addition, acoustic structures of additional embodiments may be manufactured by methods having additional or alternative steps or procedures.

Referring to FIG. 1, the acoustic structure 10 includes a honeycomb core portion 12 adhered by an adhesive 14 to at least one uncured facesheet ply 16. By combining the individual portions of the acoustic structure 10 before a single curing step, the present invention eliminates the autoclave cure of the facesheet ply alone, the application of a sacrificial layer of film adhesive, and the reticulation of a film adhesive with an air knife, all of which are required by prior art acoustic structures. By eliminating at least these processes, the acoustic structure 10 of the present invention is more cost-effective and may be more quickly manufactured.

The facesheet ply 16 of the acoustic structure 10 advantageously comprises multiple plies of hand laid up woven fabric, such as plain weave carbon fibers impregnated with epoxy resin. Further embodiments of the present invention may comprise facesheet plies of any resin reinforced woven material or may include facesheet plies of alternative materials. The uncured facesheet ply 16 also defines a plurality of perforations that are generally perpendicular to the plane of the ply. Advantageously, the at least one uncured facesheet ply 16 is vacuum bag compacted to define a prepreg "preform" prior to perforation. According to one method of the present invention as shown in FIG. 2, the preform of the uncured facesheet ply 16 is then indexed to a pin mandrel 20 and perforated using a press device. The perforations of the at least one facesheet ply 16 advantageously enhance the acoustic dampening function of the acoustic structure 10. Each perforation may define any cross-sectional size or shape, such as circular perforations with a diameter of 40 to 50 mils to list one non-limiting example, and the plurality of perforations may define any number of perforations. The plurality of perforations are also sized and relatively positioned within the at least one uncured facesheet ply 16 to affect a desired amount of dampening. The depth of the perforations are also predetermined to provide a desired amount of dampening. In the acoustic structure 10 of FIGS. 1-6, the perforations created by the pin mandrel 20 extend through the entire uncured facesheet ply 16, and the pin mandrel 20 must extend into and through the adhesive 14 to perforate the adhesive. For the acoustic structure 10 of FIGS. 2-6, the pin mandrel 20 remains within the at least one uncured facesheet ply 16 until after the acoustic structure has been cured, after which the pin mandrel may be removed.

After the uncured facesheet ply 16 has been perforated by the pin mandrel 20, the honeycomb core portion 12 with an applied adhesive 14 on one surface is positioned on the uncured facesheet ply 16. The surface of the honeycomb core portion 12 to which the adhesive 14 is applied is the surface adjacent the at least one uncured facesheet ply 16. As shown in FIG. 1, the surface to which the adhesive 14 is applied is perpendicular to the axes of the honeycombs of the honeycomb core portion 12; however, further embodiments of the present invention may adhere the adhesive to any surface of the honeycomb core portion at any orientation relative to the axes of the honeycombs. The honeycomb core portion 12 of FIGS. 1-3 does not include any attached structures; however, alternative embodiments of the present invention may include additional components, such as cured graphite/epoxy back pans for jet engine blocker door assemblies to list one non-limiting example, that provide desired functionality to the acoustic structure. The honeycomb core portion 12 of FIGS. 1-6 is advantageously a high density honeycomb core; however, the honeycomb core portion may be any honeycomb material known in the art, which are typically metal, plastic, and/or composite materials that are advantageous for lightweight structures or applications because of their relatively high strength to weight construction.

For the acoustic structure 10 of FIG. 3, the adhesive 14 is advantageously a film adhesive, and more preferably a supported film adhesive, applied to the bottom surface of the honeycomb core portion 12 such that the adhesive joins the honeycomb core portion to the at least one uncured facesheet ply 16. The adhesive 14 of FIGS. 1, 3, and 4 is advantageously a 250° F./121° C. curing fiberglass/epoxy film adhesive such as MB 1515 available from Cytec Engineered Materials of Tempe, Ariz., to list one non-limiting example. Further embodiments of the present invention may provide alternative adhesives, which may or may not require curing, for joining the honeycomb core portion and the uncured facesheet ply.

By providing the adhesive 14 to join the honeycomb core portion 12 and the uncured facesheet ply 16, the present invention eliminates the need to apply a sacrificial layer of film adhesive, to mechanically abrade the sacrificial layer of film adhesive, and to reticulate the adhesive with an air knife. The adhesive 14 of FIGS. 1, 3, and 4 is applied to the appropriate surface of the honeycomb core portion 12 and then applied to the at least one uncured facesheet ply 16 to adhere the honeycomb core portion to the facesheet ply. As shown in FIGS. 2-4 and described above, the pins of the pin mandrel 20 extend beyond the uncured facesheet plies 16 such that the pin mandrel perforates the entire thickness of the adhesive 14 as well. FIGS. 2-4 also illustrate the vacuum bag 22, the breather 24, the vacuum sealer tape 26, and the edge breather 28, which are known in the art for vacuum bag compaction. Also illustrated is a tool surface 30 upon which the pin mandrel 20 is positioned and the sealer tape 26 provides the vacuum seal. Further embodiments of the present invention may utilize alternative devices for vacuum bag compaction or may combine the portions of the acoustic structure by alternative processes. Still further embodiments of the present invention may utilize alternative devices for combining the honeycomb core portion, adhesive, uncured facesheet ply, and any other portions.

Throughout the processes described above, the honeycomb core portion 12 and the adhesive 14 are uncured, such that no portion of the assembled acoustic structure 10 of FIG. 4 has been cured. Once the at least one uncured facesheet ply 16 has been adhered to the honeycomb core portion 12 by the adhesive 14, the assembled acoustic structure, including the pin mandrel 20, undergoes a curing process. Preferably the acoustic structure 10 undergoes an autoclave curing process while it is within the vacuum bag compaction device, as known in the art. The autoclave pressure and vacuum assist the consolidation and bonding of the plies of the at least one uncured facesheet ply 16. The pressure exerted during the autoclave curing is advantageously 30 to 150 psi, and more preferably 40 to 50 psi, and the curing temperatures are advantageously 100° F. to 500° F., more preferably 200° F. to 400° F., and still more preferably 250° F. to 350° F., depending upon the curing temperature required by the adhesive 14. The curing time for is also dependent upon the particular acoustic structure; however, the curing time, including the heat up and cool down periods, is preferably between one to ten hours and more preferably from four to five hours. Alternative methods of the present invention may cure the acoustic structure by alternative curing techniques. After the curing process has been completed, the pin mandrel 20 is removed from the acoustic structure 10. The pin mandrel 20 of FIGS. 2-6 is advantageously a reusable pin mandrel that may be separated from the acoustic structure 10. However, further embodiments of the present invention may utilize a disposable injection molded pin mandrel that is destroyed as it is removed from the acoustic structure. Still further embodiments of the present invention may define the plurality of perforations in the uncured facesheet ply by alternative processes.

Accordingly, the present invention provides a method of manufacturing the acoustic structure 10. If two or more individual plies are included in the facesheet ply 16, the uncured facesheet ply is advantageously vacuum bag compacted prior to perforation. FIGS. 2-4 represent the method of perforating at least one uncured facesheet ply to define a plurality of perforations in the facesheet ply. As shown in FIGS. 2 and 3, the uncured facesheet ply 16 is advantageously perforated by vacuum bag compacting the facesheet ply onto the pin mandrel 20 prior to applying the adhesive 14 to the facesheet ply. Alternatively, perforating the facesheet ply 16 may be accomplished by pressing a pin mandrel 20 through the facesheet ply. Separately, the adhesive 14 is applied to a surface of the honeycomb core portion 12, advantageously by applying a film adhesive to the surface of the honeycomb core portion, as shown in FIG. 3. FIG. 4 illustrates the adhering of the honeycomb core portion 12 to the facesheet ply 16 such that the adhesive 14 adheres the honeycomb core to the uncured facesheet ply. The honeycomb core portion 12, adhesive 14, and facesheet ply 16 are cured, preferably by autoclave curing at or above a temperature of 200° F., to define the acoustic structure 10. After the curing is complete, the pin mandrel 20 is advantageously removed from the acoustic structure 10.

The present invention also provides alternative methods of manufacturing the acoustic structure, such as the method illustrated in FIGS. 5 and 6, to describe one non-limiting example of an alternative method. As shown in FIG. 5, the adhesive 114 is adhered to the at least one uncured facesheet ply 116 prior to the perforation of the facesheet ply and adhesive, which defines perforations in both the facesheet ply and adhesive. The facesheet ply 116 and adhesive 114 are advantageously perforated by vacuum bag compacting, or otherwise pressing, the facesheet ply and adhesive onto the pin mandrel 120, such that the pins perforate both the facesheet ply and the adhesive as shown in FIG. 6. The honeycomb core portion is then adhered to the adhesive 114, and the honeycomb core portion, adhesive, and facesheet ply are cured to define the acoustic structure. The pin mandrel 120 is advantageously removed after the curing is complete. Still further embodiments of the present invention define alternative methods of manufacturing the acoustic structure of the present invention.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An acoustic structure comprising:
   at least one uncured facesheet ply;
   a plurality of pins extending through the facesheet ply to define a plurality of perforations;
   an adhesive; and
   a honeycomb core portion adhered to the facesheet ply with the adhesive, wherein the facesheet ply and adhesive are uncured, and wherein the plurality of pins remain within the facesheet ply while the honeycomb core portion is adhered to the facesheet ply.

2. An acoustic structure according to claim 1 wherein the facesheet ply comprises a plurality of woven fabric plies.

3. An acoustic structure according to claim 1 wherein the adhesive comprises a film adhesive.

4. An acoustic structure according to claim 3 wherein the film adhesive comprises a supported film adhesive.

5. An acoustic structure according to claim 3 wherein the film adhesive comprises an epoxy film that cures at a temperature at or above 200° F.

6. An acoustic structure according to claim 1 wherein the at least one uncured facesheet comprises a vacuum bag compacted prepreg preform.

7. A method of manufacturing an acoustic structure, comprising the steps of:
   perforating at least one uncured facesheet ply with a plurality of pins to define a plurality of perforations in the facesheet ply;
   applying an adhesive to a surface of a honeycomb core portion;
   adhering the honeycomb core portion to the uncured facesheet ply so that the adhesive adheres the honeycomb core portion to the facesheet ply;

curing the honeycomb core portion, adhesive, and facesheet ply to define the acoustic structure while the pins remain within at least the facesheet ply; and removing the pins from at least the facesheet ply after said curing.

8. A method according to claim 7, further comprising the step of vacuum bag compacting the facesheet ply prior to perforating the facesheet ply with the plurality of pins.

9. A method according to claim 7 wherein perforating the facesheet ply comprises pressing a pin mandrel through the facesheet ply.

10. A method according to claim 9, further comprising the step of removing the pin mandrel from the facesheet ply after the curing step.

11. A method according to claim 7 wherein applying an adhesive comprises applying a film adhesive to the surface of the honeycomb core portion.

12. A method according to claim 7 wherein curing the honeycomb core portion, adhesive, and facesheet ply comprises autoclave curing the honeycomb core portion, adhesive, and facesheet ply.

13. A method according to claim 12 wherein autoclave curing the honeycomb core portion, adhesive, and facesheet ply comprises curing at or above a temperature of 200° F.

* * * * *